UNITED STATES PATENT OFFICE.

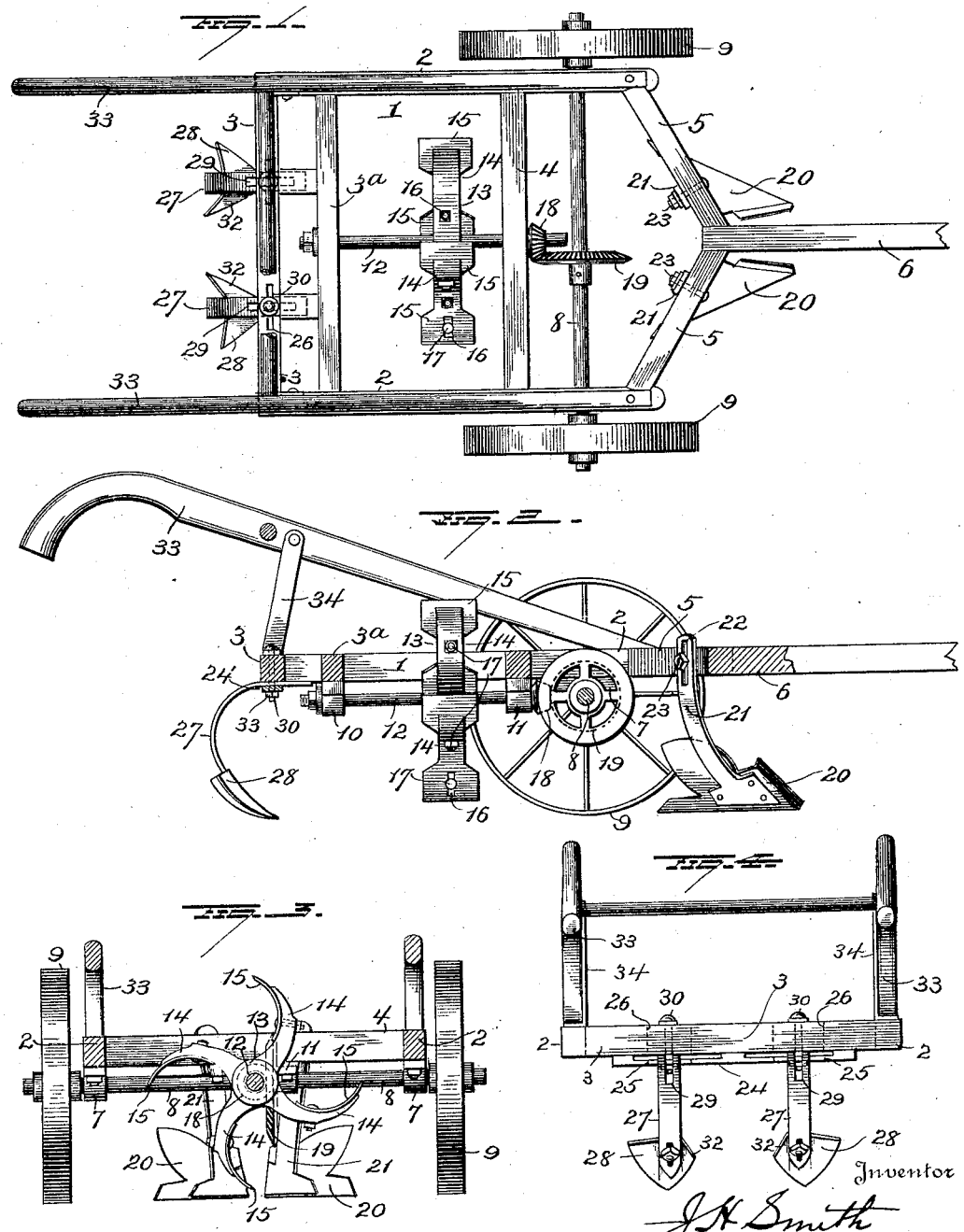

JAMES HENRY SMITH, OF SALINE, LOUISIANA.

COMBINED COTTON CHOPPER AND CULTIVATOR.

1,389,461. Specification of Letters Patent. Patented Aug. 30, 1921.

Application filed June 30, 1920. Serial No. 393,054.

*To all whom it may concern:*

Be it known that I, JAMES H. SMITH, a citizen of the United States, and a resident of Saline, in the parish of Bienville and State of Louisiana, have invented certain new and useful Improvements in Combined Cotton Choppers and Cultivators; and I do hereby declare the following to be a full, clear, and exact description of the invention, such as will enable others skilled in the art to which it appertains to make and use the same.

This invention relates to improvements in combined cotton choppers and cultivators,— the object of the invention being to provide an implement of this character which shall be simple and substantial in construction; which shall be accurate and effectual in operation, and in which adequate provision shall be made to permit easy and quick adjustment of the working parts and thus adapt the implement to varying conditions which may be met.

With this and other objects in view, the invention consists in certain novel features of construction and combinations of parts as hereinafter set forth and pointed out in the claims.

In the accompanying drawings. Figure 1 is a plan view of a combined cotton chopper and cultivator showing an embodiment of my invention. Fig. 2 is a longitudinal section. Fig. 3 is a transverse section, and Fig. 4 is a rear end view.

1 represents the rectangular frame of the implement which may be made of metal or other substantial material and comprises side beams 2, a rear cross-bar 3, and intermediate cross-bar 4, and a forward cross member 5 having an extension 6 with which hitching means may be connected.

Axle-boxes 7, 7, are secured under the side beams of the frame near their forward ends, for the accommodation of an axle 8, the ends of which latter are secured to the hubs of traction wheels 9.

The rear cross-bar 3 of the frame may be made with a forwardly projecting enlargement 3ª, to the underside of which a journal box 10 is secured,—a similar journal box 11 being secured under the intermediate cross-bar 4. These journal boxes provide bearings for a shaft 12 located in line with the longitudinal center of the frame. This shaft has secured thereto, between the cross-bars 3 and 4, a hoe-wheel 13 having a plurality of curved arms 14, to each of which latter the shanks of hoes 15 are secured. In order to provide ready means whereby the hoes may be adjusted, the shank of each hoe is made with an elongated slot 16 through which a fastening device, such as a screw 17, passes and enters the curved arm of the wheel for securing the hoe to the arm in any desired position of adjustment.

The shaft 12 terminates at its forward end just in rear of the axle 8 and carries a beveled pinion 18 to mesh with a bevel gear 19 on said axle, so that as the implement travels forwardly, motion will be transmitted from the carrying wheels through the axle and gearing to the shaft 12 for rotating the hoe wheel. The gear 19 may be secured to the axle by a set screw and the pinion 18 may be similarly secured to the shaft 12, so that should it be desired to change the speed of rotation of the hoe wheel, this may be accomplished by moving the gear away from the pinion and then removing the latter and replacing it with a larger or smaller pinion.

Forward plows 20, 20, reversely disposed and spaced apart are connected with the forward member 5 of the frame through the medium of standards 21. It will be observed that the rear edge of the forward frame member 5 converges from the respective side members to the center of said frame member 5 and the standards 21 of the forward plow rest against the inclined edges thus formed. The upper portion of each standard 21 is made with an elongated slot 22 for the passage of a fastening device, such as a screw 23 and thus vertical adjustment of said forward plows may be effected.

A plate 24 is secured to the underside of the rear frame-bar 3 by means of fastening devices spaced apart and between these fastening devices the plate 24 is provided with elongated slots 25,—the rear frame member being also provided with elongated slots 26 which aline with the elongated slots of said plate. The standards 27 of rear cultivator shovels or plows 28 are so shaped that their upper portions may pass between the under face of the rear frame bar 3 and the plate 24 secured thereto and the said upper portions of the standards 27 are provided with elongated slots 29. Bolts 30 pass through the slots in the rear frame-bar 3, the slots in the plow standards and the slots in the plate 24 and these bolts are provided at one end with nuts 31 which, when tightened on the bolts, will effect a clamping action of the plow standards between the rear frame bar and the plate 24. By connecting the rear plows with the frame in the manner above explained, said plows may be adjusted toward or away from each other to space any desired distances apart and they may also be adjusted so as to alter their angularity to the ground and the standards being curved, the plows may be raised or lowered to the extent of the arc through which they move when their angularity is being adjusted. The upper end portions of the standards 27 are straight and hence the rear plows may be adjusted forwardly or rearwardly.

The rear plows may be adjustably secured to the standards by pin and slot construction and the inner wings of the respective rear plows are bent downwardly or rearwardly as indicated at 32 to prevent them from throwing too much dirt over young plants.

Handle-bars 33 are secured to the frame at or near the forward ends of the side beams thereof and their rear portions are supported and braced by means of standards 34 secured at their upper ends to said handle-bars and at their lower ends to the rear portion of the frame.

Having fully described my invention what I claim as new and desire to secure by Letters-Patent, is:

1. An implement of the character described comprising a wheeled frame having converging forward portions, forward plows adjustably connected with the respective converging portions of the frame, said plows being reversely disposed relative to each other, plows spaced apart at the rear end of the frame, and means adjustably connecting said last mentioned plows with the rear end of the frame in a manner to permit adjustments of said plows in directions at right angles to each other.

2. An implement of the character described, comprising a wheeled frame, forward plows having vertically adjustable connection with the forward portion of the frame, said plows being reversely disposed relatively to each other, and shovel plows adjustably connected with the rear end of the frame and spaced apart, said shovel plows having their inner wings bent rearwardly.

3. An implement of the character described, comprising a wheeled frame, a revoluble hoe wheel mounted therein, and gearing for driving said hoe wheel, said wheel frame having elongated slots in its rear cross member, of rear plows provided with curved standards having elongated slots, and fastening means passing through the elongated slots in the rear cross member of the frame and through the slots in the standards of the rear plows.

4. An implement of the character described comprising a wheeled frame having a rear cross-member provided with elongated slots, of a plate secured to said rear cross member and having elongated slots alining with the slots in said rear cross member, two rear plows each having a standard provided with a slotted part passing between the rear cross member of the frame and said plate, bolts passing through the slots of the rear cross member, said plate and the plow standards, and nuts on said bolts, said bolt and nut constructions operating to clamp the plow standards between the rear cross member of the frame and the plate secured thereto.

In testimony whereof, I have signed this specification in the presence of two subscribing witnesses.

JAMES HENRY SMITH.

Witnesses:
W. F. FREY,
F. W. RIDDLE.